United States Patent [19]

Lausch

[11] B 3,994,770

[45] Nov. 30, 1976

[54] TREATMENT OF WASTE PAPER, ESPECIALLY TO EFFECT THE RECOVERY OF CLEAN FIBERS THEREFROM

[75] Inventor: Heinz Lausch, Heidenheim (Brenz), Germany

[73] Assignee: J. M. Voith GmbH, Heidenheim (Brenz), Germany

[22] Filed: July 25, 1974

[21] Appl. No.: 491,673

[44] Published under the second Trial Voluntary Protest Program on February 17, 1976 as document No. B 491,673.

[30] Foreign Application Priority Data
Aug. 4, 1973  Germany............................ 2339591

[52] U.S. Cl. .................................... 162/5; 162/6; 162/8; 162/55; 162/191; 209/163; 209/173; 241/21; 241/60
[51] Int. Cl.² ....................... D21C 5/02; D21F 1/66
[58] Field of Search .............. 162/5, 6, 8, 55, 191, 162/261; 241/12, 16, 21, 60, 61, 68, 76, 152 R; 209/163, 173, 197, 199

[56] References Cited
UNITED STATES PATENTS

| | | | |
|---|---|---|---|
| 2,005,742 | 6/1935 | Hines | 162/8 X |
| 2,083,884 | 6/1937 | Wells | 162/5 |
| 3,245,868 | 4/1966 | Espenmiller et al. | 162/191 X |
| 3,248,277 | 4/1966 | Gärtner | 162/5 |
| 3,440,134 | 4/1969 | Murphy | 162/8 |
| 3,441,130 | 4/1969 | Sisson et al. | 162/55 X |

Primary Examiner—Robert L. Lindsay, Jr.
Attorney, Agent, or Firm—Melvin A. Crosby

[57] ABSTRACT

Waste paper is treated to recover the fiber content thereof in a clean condition and without damaging the fibers by shredding the paper, admixing the paper with a treatment agent, retaining the paper and admixed treatment agent in a treatment zone for a period of time during which the paper is substantially completely disintegrated in the treatment agent, diluting the mixture, and processing the mixture through further treatment stations to a final flotation stage wherein the now clean fibers are separated from the liquid whereby the fibers can then be used in a further papermaking operation.

20 Claims, 1 Drawing Figure

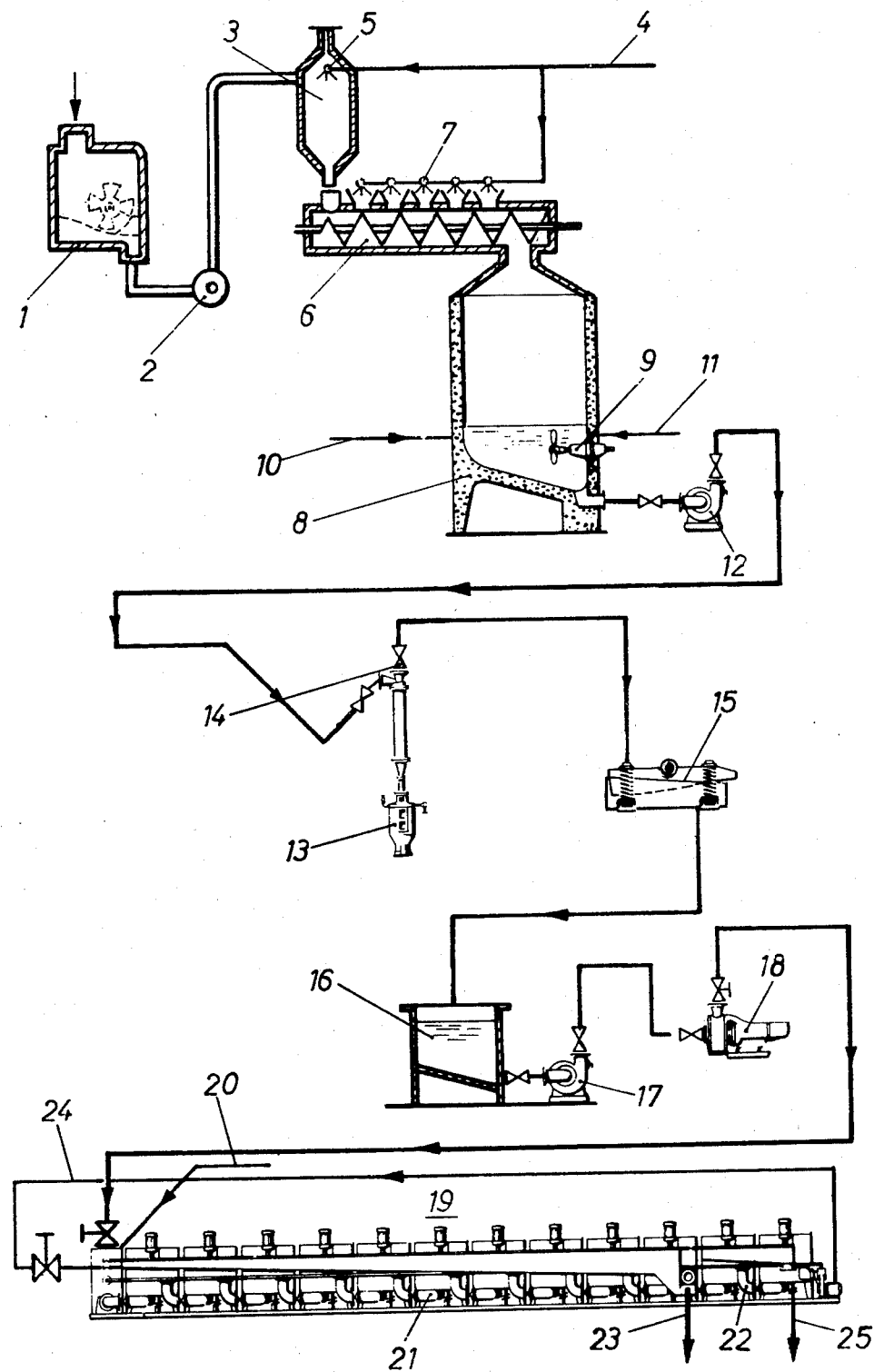

TREATMENT OF WASTE PAPER, ESPECIALLY TO EFFECT THE RECOVERY OF CLEAN FIBERS THEREFROM

The present invention relates to the treatment of waste paper, especially for the recovery of the fiber content thereof.

The recovery of fibers from waste paper is known and is accomplished, in general, by the treatment of the paper with a chemical treatment agent, and the beating of the paper, and then the extraction of fibers from the treated material. A particular problem encountered in the recovery of fibers from waste papers is the removal of printers ink from the waste paper.

In general, two procedures are employed for the treatment of waste paper, namely, by a washing of the paper or by a flotation process. When the waste paper is treated by washing, as compared to the treatment of the waste paper by flotation, there is a great loss of fibers and the generation of large amounts of dirty water. For this reason, the processing of waste paper to recover the fibers therefrom has substantially always been carried out by using a flotation process.

Heretofore, the preparation of waste papers utilizing the flotation process was carried out by introducing printed waste paper into a pulper with the addition of the necessary chemical treatment agent and at an elevated temperature. Further, the waste paper was mechanically treated in the pulper by a rotating member and at a stock density of about 6 weight per cent on the basis of dry matter.

Thereafter, large, heavy particles were removed in a cleaner and other impurities, particularly floating impurities, were removed by a screen. Still further, a deflaker or fiberizer, and which should effect no shortening of the paper fibers, was employed to deflake specks and remove dirt from the now dissolved waste paper. Finally, the disintegrated waste paper, and which is herein referred to as "stuff," was introduced into a substantially conventional flotation installation. Such a flotation installation is described in the J. M. Voith Catalog No. 2106.

The cleaning procedure generally outlined above has the drawback that the cost of the procedure is rather high while, furthermore, the treatment of the paper during the mechanical disintegrating thereof to effect disintegration of the paper results in the reduction of particles of foil, particles of latex and the like to such a degree of fineness that these particles can be removed from the resulting stuff only with great difficulties.

The degree of whiteness of any paper made from the resulting recovered fibers was, thus, caused to be rather low and the recovered fibers were defective for use in connection with high quality papers.

With the foregoing in mind, the principal objective of the present invention is the provision of a method and apparatus for treating waste paper, especially for the recovery of the fiber content thereof, which is more economical to carry out and which results in a higher quality fiber which can be used in a great many paper-making applications.

The proposed apparatus is schematically illustrated in the accompanying single sheet of drawings.

BRIEF SUMMARY OF THE INVENTION

According to the present invention, the waste paper is shredded and is conveyed to a reaction tower while, during the conveying, the waste paper is intimately admixed with a chemical treatment agent.

The conveying of the paper following shredding thereof takes place without any reduction in the length of the fibers in the paper and the disintegration of the paper which takes place in the reaction tower to which the shredded paper-treatment agent mixture is supplied is in the form of a purely chemical disintegrating of the paper and not a mechanical disintegration as occurs in pulpers according to the prior art whereby the fibers of the paper are not beaten up to reduced length. Furthermore, the fibers are not heated in the reaction zone and, thus, there is a heat economy effected by the practice of the present invention.

The mixture of paper and treatment agent within the reaction zone, or reaction tower, has a stuff density of at least 12 weight per cent on the basis of the dry matter in the mixture. This is a relatively thick stuff as opposed to the relatively thinned out stuffs which are handled in the processes according to the prior art.

The material remains in the reaction tower for a length of time which depends on the degree of disintegration desired and when the material is removed from the tower, it is diluted so that the stuff suspension can be readily processed.

While the advantage exists of a gentle handling of the fibers of the waste paper, the chemical reaction is, nevertheless, forceful because the treatment agent can be highly concentrated rather than being diluted with water. The stronger concentration of the treatment agent is particularly beneficial in respect of the removal of inks from the paper. The chemical treatment agent in the higher concentration thereof acts directly upon the printers inks because, when the shredded paper is first delivered to the reaction tower, the paper texture is still intact.

Even the pigments which adheres most strongly to the paper, such as the pigments employed in off-set printing, can be removed in the present process and, furthermore, the pigment binders which are specifically compounded so as to be soluble only with difficulty, are also removed from the paper. Such a binder, for example, is asphalt pitch.

The chemical treatment agent is, thus, more efficiently employed than heretofore and better results can be obtained in employing the same amount of treatment agents or it is even possible, in cases, to reduce the amount of treatment agent employed while still obtaining the same results. Also, as mentioned, energy is conserved because it has been found that it is no longer necessary to supply heat to the paper and chemical agent during the dissolving of the paper.

The highly concentrated treatment agent also effects complete disintegration of the waste paper, forming a thick stuff therefrom, but since there is no beating of the paper, any foils, latex particles and other alien material will not be reduced in size and, later on in the process, such particles and foreign matter and foils and the like can readily be removed from the stuff. Still further, the advantage exists that the recovery of the fiber content can now be operated substantially as a continuous process.

The thick stuff from the reaction tower is, as mentioned, diluted so that it can be processed through further cleaning stations and through a flotation installation and the water which is separated from the fiber in the flotation stage is advantageously returned to the reaction tower for dilution of the stuff therein as the stuff is withdrawn from the tower.

DETAILED DESCRIPTION OF THE INVENTION

Referring to the drawing somewhat more in detail, waste paper to be treated is shredded in a shredder schematically indicated at 1 and then is blown by a blower 2 into a cyclone 3. Within the cyclone the vehicle air is separated from the paper. A conduit 4 leads into the upper end of cyclone 3 and terminates in a spray nozzle 5 which sprays an alkaline chemical solution on the shredded paper in the cyclone 3 in a weight ratio of about 1 to 1.

The alkaline chemical solution advantageously consists of waterglass and peroxide and which causes the fibers finally recovered to be lighter in color while, also destroying the pigments in the inks on the paper.

The treatment agent, furthermore, contains as an auxiliary agent for whitening purposes, and so as to get good flotation, some oleic acid which, inasmuch as the basic solution is alkaline, has already been transformed into a soap at the time the treatment agent is sprayed into cyclone 3.

Calculated on the basis of the dry content, the treatment agent is made up of about 1.5 to about 2 per cent sodium peroxide, about 3 to about 4 per cent waterglass, and about 0.8 to 0.9 per cent oleic acid. It is understood that, instead of sodium peroxide, there may be employed the equivalent amounts of sodium hydroxide and hydrogen peroxide.

Still further, the removal of the pigments from the paper fibers can be facilitated by the addition of detergents or surface tension reducing agents to the solution such as the reaction products of polyethylene oxide with fatty alcohols and fatty acids, alkyl phenol, polyglycerol, ethers or esters, or alkyl sulfonates.

From the cyclone 3, the wetted waste paper is supplied to one end of a worm conveyor 6 which extends substantially in the horizontal direction and distributed along which is a group of spray nozzles 7 and from which the same treatment agent is sprayed that is supplied to spray nozzle 5. The treatment agent supplied by nozzles 7 changes the ratio of waste paper to the treatment agent, on the basis of weight, to about 1 to 4.

The waste paper which has now become thoroughly saturated with the treatment agent, drops from the end of the worm conveyor 6 into a reaction tower 8 where it remains for about 2 hours. Within reaction tower 8, the density of the mixture is about 16 to 20 weight per cent on the basis of dry content. Within the reaction tower, the mixture will result in a suspension due to the digestion of the waste paper which will occur in the space of, as mentioned, about two hours.

In the lower region of the reaction tower is a propeller 9 and, also, in the bottom of the reaction tower are conduits 10 and 11 which supply water for dilution of the disintegrated stuff in the reaction tower. The revolving propeller readily effects final disintegration of the paper into individual fibers while, simultaneously, mixing the resulting suspension with the incoming water.

In its now thinned state of about 4 to 5 weight per cent dry matter, the stuff is conveyed by a pump 12 to the inlet of a hydrocyclone 13 and within which the heavy particles become separated and pass downwardly out of the hydrocyclone while the usable suspension free of heavy particles is removed from the hydrocyclone via outlet 14. This material is then delivered to a vibratory screen 15 and floating impurities are removed from the stuff.

The suspension is next supplied to a stuff chest 16 and is conveyed from there via pump 17 into a deflaker 18. Within the deflaker 18 the degree of beating of the paper fibers is not increased so that full length fibers are removed from the cleaner 18 and pass to the left end of a flotation installation generally indicated at 19 and which may be of a known type. A conduit 20 supplies dilution water to the inlet end of flotation installation 19 to dilute the incoming suspension down to about 0.8 to about 1.0 per cent dry matter.

The flotation installation comprises a primary stage 21 toward the left having several cells therein and a secondary stage 22 toward the right made up of two cells.

The primary stage serves for the cleaning of the raw material and the cleaned suspension coming therefrom passes through outlet conduit 23 to a point of use. The foam and the like from the primary stage 21 still contains a substantial amount of fibers in addition to the dirt particles and part of the fillers from the paper and is passed to the secondary stage 22 wherein a substantial percentage of the good fibers are removed. The good fibers removed are returned to the inlet end of the flotation installation via conduit 24 for renewed treatment.

The discard from the secondary stage 22, which is generally in the form of foam and is in a thickened state with about 35 to 45 per cent dry matter, represents discard which is conveyed away from the installation.

A substantial amount of clear water results from the processing of the stuff in the flotation installation and this water is advantageously returned into the system for the dilution of the stuff, for example, by way of conduits 10 and 11 associated with the reaction tower.

It will be seen that the solution of chemicals is added in two steps, that is to say, in the cyclone 3 and the worm conveyor 6. The solution serves to break up the paper into individual fibers; to remove the printing inks and pigments by hydrolyzing the binder; and to brighten the fibers and destroy the dyes. The alkaline solution of chemicals in its entirety brings about a swelling of the paper and in this way loosens the fiber aggregates which make up the paper. The fiber aggregates or associations then fall apart into individual fibers.

Modifications may be made within the scope of the appended claims.

What is claimed is:

1. A method of treating waste paper, especially for recovery of the fiber therefrom, which comprises; shredding the paper, conveying the shredded paper to a reaction zone while simultaneously admixing a treatment agent with the shredded paper up to about 7½ parts by weight of the agent to one part by weight of shredded paper, retaining the shredded paper treatment agent mixture in said reaction zone in the absence of the application of pressure and any significant increase in temperature for digestion of the shredded paper thereby to form a material in the form of a fibrous suspension, adding water to the said material prior to removal thereof from the reaction zone, cleaning and deflaking the diluted material, then subjecting the cleaned diluted material to flotation to effect at least partial separation of the fiber fraction thereof from the liquid fraction, and recovering at least said fiber fraction for reuse.

2. The method according to claim 1 which includes admixing the shredded paper with about an equal weight amount of said treatment agent prior to initiating the conveying of the shredded paper to said reaction zone.

3. The method according to claim 1 which includes blowing the shredded paper following shredding thereof through a chamber while separating the vehicle air therefrom and while spraying said treatment agent into the chamber in a weight amount about equal to the weight of the shredded paper, and effecting said conveying of the shredded paper to said reaction zone after the shredded paper leaves said chamber.

4. The method according to claim 1 in which the mixture of shredded paper and treatment agent has a stock density of about 16 to 20 per cent when introduced into said reaction zone and the mixture is retained in said reaction zone for about 2 hours for digestion thereof.

5. The method according to claim 1 in which at least a part of the water fraction separated from said material during flotation is returned to said reaction zone for use in diluting the said material therein prior to withdrawing the material from the reaction zone.

6. The method according to claim 1 in which said treatment agent is an alkaline solution.

7. The method according to claim 6 in which said solution consists of waterglass and sodium peroxide and oleic acid.

8. The method according to claim 6 in which said solution consists of waterglass, sodium hydroxide, hydrogen peroxide, and oleic acid.

9. The method according to claim 6 in which said treatment agent includes a surface tension reducing agent.

10. The method according to claim 9 in which said surface tension reducing agent includes the reaction product of polyethylene oxide and at least one of fatty alcohol and fatty acids, alkylphenol, polyglycol ethers or esters, and alkyl sulfonates.

11. The method according to claim 1 in which said mixture is digested in the reaction zone to a fiber concentration of about 16 to 20 per cent and is diluted to a fiber concentration of about 4 to 5 per cent prior to withdrawal of the material from said reaction zone.

12. The method according to claim 11 which includes centrifuging the digested and diluted material withdrawn from the reaction zone to separate heavier particles therefrom.

13. The method according to claim 12 which includes screening the material following the centrifuging thereof to remove floating impurities therefrom.

14. The method according to claim 13 which includes passing the material through a deflaker or fiberizer following the screening thereof.

15. The method according to claim 12 which includes diluting said material with water to a fiber content of about 0.8 to 1.0 per cent immediately prior to flotation thereof.

16. An apparatus for processing waste paper, especially for recovery of the fiber content thereof comprising; shredding means for shredding the paper, a reaction tower, a worm conveyor which receives paper from the shredding means and delivers the shredded paper to the reaction tower, a spray device for spraying a treatment agent on the shredded paper during movement thereof along said conveyor, said reaction tower retaining the shredded paper treatment agent mixture therein without the application of pressure or heat for a predetermined length of time to form a suspension of the solid and fibours content of the paper in liquid, said reaction tower having a discharge port and conduit means for supplying water to the tower in the region of said port to dilute the material in the tower at the time of discharge of the material from the tower, and means for treating the material discharged from the tower to separate clean fibers from the material and including centrifuging, screening, deflaking and flotation devices.

17. An apparatus according to claim 16 which includes a blower connected to receive shredded paper from the shredding means, a cyclone chamber connected to receive shredded paper and vehicle air from the blower and operable to separate the paper from the air and to deliver the paper to said worm conveyor, and a spray device in said chamber operable for spraying treatment agent on the paper in said chamber whereby the shredded paper is wetted with treatment agent when supplied to said worm conveyor.

18. An apparatus according to claim 16 which includes means for supplying water separated from said mixture during flotation to said conduit means for diluting the material in the tower.

19. An apparatus according to claim 16 in which said worm conveyor is substantially horizontal and said spray device includes downwardly directed spray nozzles in distributed relation along the length of and above the worm conveyor.

20. An apparatus according to claim 16 which includes a propellor device in said tower adjacent said port and operable to reduce paper shreds in the tower to suspension prior to discharge of material from the tower.

* * * * *